United States Patent Office 2,831,797
Patented Apr. 22, 1958

2,831,797

CEPHALOSPORIN N PRODUCTION

George Arthur Miller and Brendan Kevin Kelly, Clevedon, and Guy Geoffrey Frederick Newton, Oxford, England, assignors to National Research Development Corporation, London, England, a British company No Drawing. Application October 11, 1954
Serial No. 461,684

Claims priority, application Great Britain
October 15, 1953

11 Claims. (Cl. 195—36)

This invention relates to fermentation media for use in the production of antibiotic materials and in particular to fermentation media for the production of a penicillinase-sensitive antibiotic material active against both gram negative and gram positive bacteria from a mould of the species of which Cephalosporium I. M. I. 49137 is a member.

It is an object of this invention to provide a fermentation medium which leads to the production of the said penicillinase-sensitive antibiotic material, which is conveniently termed Cephalosporin N, in high yield.

It has already been shown that when a nutritional substrate is fermented with a mould of the species of which Cephalosporium I. M. I. 49137 is a member of which a culture has been deposited in the American Type Culture Collection under the number: 11550, there is produced a mixture of antibiotic materials. This mixture of materials contains at least two antibiotic materials one of which is active against gram positive bacteria only, while the other is active both against gram negative and gram positive bacteria. The particular strain of this species which has been indexed at the Imperial Mycological Institute as Cephalosporium I. M. I. 49137 gives particularly high yields of antibiotic mixture. It has also been shown by Florey et al. in connection with co-pending application Serial No. 396,742 that when the nutritional substrate contains sucrose and/or lactose, a source of arganic nitrogen and ammonium acetate, the proportion of Cephalosporin N in the antibiotic mixture is greatly increased, particularly when the source of organic nitrogen is corn steep liquor.

It has now been discovered that the amino acid, d-methionine, has, when present in the nutritional substrate, the effect of increasing the titro of Cephalosporin N in the fermentation medium. Accordingly the present invention provides a fermentation medium for use in the production of a penicillinase-sensitive antibiotic material active against both gram negative and gram positive bacteria from a mould of the species of which Cephalosporium I. M. I. 49137 is a member, which comprises a nutritional substrate for said mould in admixture with an active proportion, as hereinafter defined, of d-methionine. The present invention also provides a process for the production of a penicillinase-sensitive antibiotic material active against both gram negative and gram positive bacteria which comprises fermenting a nutritional substrate in admixture with an active proportion, as hereinafter defined, of d-methionine with a mould of the species of which Cephalosporium I. M. I. 49137 is a member in the presence of molecular oxygen and separating the mould and the antibiotic material thereby produced.

It has been found that with a nutritional substrate to which has been added a wide range of amino acids the first amino acids to be consumed by the mould are methionine, proline, valine and leucine, but it is also found that of these four amino acids, only methionine is capable of producing an increased yield of Cephalosporin N, and that neither proline nor leucine nor valine have any observable effect whatsoever.

The addition of d-methionine to any nutritional substrate, i. e. a substrate of such composition that the mould may be provided with sufficient nutritional components to enable it to grow, results in the production of an increased yield of Cephalosporin N. It is found that as the amount of methionine in any nutritional substrate is increased from zero, the titre of Cephalosporin N also increases until the amount of d-methionine reaches a certain optimum value. Further increase of the methionine content has no effect until the quantity of d-methionine reaches a certain value considerably beyond the optimum value where the beneficial effect begins to disappear and is finally lost. By the term "an active proportion of d-methionine" as used herein is meant a proportion of d-methionine which leads to the production of increased titres of Cephalosporin N. It is impossible to give in this specification the numerical values of active proportions associated with the various nutritional substrates which may be employed, but those skilled in the art will have no difficulty in determining the range of active proportions for any particular substrate which may be chosen. The titre of Cephalosporin N can always be increased by the addition of d-methionine and, generally speaking, those substrates which give the highest titre without methionine will also give the highest titre with methionine.

The substrates preferably used in accordance with this invention are those which contain a source of organic nitrogen as those substances are found to give the highest titres. Available sources of organic nitrogen include fish meal, meat meal, casein, bouillon powder, dried antolysed yeast, the product known as "Marmite," malt extract, urea, soya bean meal, corn meal, corn steep liquor and many others. It is not however essential to provide a source of organic nitrogen and substrates containing only inorganic nitrogen yield in the presence of d-methionine greatly increased titres of Cephalosporin N. Indeed the titres may be increased by as much as two-fold. Our preferred substrates contain sucrose and/or lactose and ammonium acetate in addition to the source of organic nitrogen, which source most preferably consists at least in part of corn steep liquor. When the substrates contain corn steep liquor, sucrose and ammonium acetate, the optimum addition of d-methionine is found to be about 0.025% by weight based on the weight of the substrate. This figure may be increased without loss of titre up to 0.05%. Beyond this figure however the increase in titres is less pronounced and is found to be lost at about 0.25%.

In co-pending application Serial No. 396,742 it is indicated that the amount of sucrose and/or lactose present in the substrate is preferably from 1 to 4% by weight, the amount normally used being about 2%. As will be evident from Example 4 of the present specification, the fermentation medium provided by this invention desirably contains more than 2% by weight of the sucrose and/or lactose.

It is found that although d-methionine is the main active isomer, l-methionine has no deleterious effect upon the fermentation; consequently the relatively cheap racemic dl-methionine is preferably used in practice. It will, of course, be appreciated that where dl-methionine is used, its effect on the fermentation is approximately equal to that of half its weight of d-methionine.

Although the new fermentation medium provided by the invention finds its greatest use in connection with the production of Cephalosporin N, we find that with most nutritional substrates the addition of d-methionine produces increased titres of Cephalosporin P, although the increase is less remarkable.

The mould and the Cephalosporin N may be separated after fermentation by filtration or centrifuging and Cephalosporin N may be extracted from the resulting impure solution, by the procedures described in connection with co-pending application Serial No. 396,742, e. g. by contacting said impure solution with charcoal under mildly acid conditions, eluting adsorbed Cephalosporin N from the charcoal, contacting the eluate with a column of alumina and eluting adsorbed Cephalosporin N from the column.

The following examples are given in order to illustrate the invention.

Example 1

A series of flasks was prepared each containing 4 litres of a medium comprising corn steep liquor in quantity sufficient to provide 800 mg. of nitrogen per litre, sufficient ammonium acetate to provide 800 mg. of nitrogen per litre and 2% by weight of sucrose. To half of the flasks 0.05% by weight of dl-methionine was added. The contents of the flasks were adjusted to pH 6.8 with caustic soda and sterilised for 1 hour at 15 lbs./sq. in.

Each flask was then inoculated by 2% by volume of a 72-hour growth of Cephalosporium I. M. I. 49137 which had been prepared by inoculating spores into 8 litres of a medium comprising sufficient corn steep liquor to provide 800 mg. of nitrogen per litre and 2% of glucose, incubating at 24° C. while passing air through the medium at 20 litres per minute and stirring at 300 R. P. M.

The flasks were incubated at 24° C. while passing 6 litres of air per minute through each and stirring at 600 R. P. M. After 46 hours of fermentation under these conditions the contents of the flasks were assayed for Cephalosporin N and it was found that those flasks to which methionine had been added assayed 10.9 units/ml. while those flasks to which no methionine had been added assayed 6.6 units/ml.

Example 2

A series of flasks was prepared each containing 4 litres of a medium comprising:

800 mg. of nitrogen per litre in the form of corn steep liquor
800 mg. of nitrogen per litre in the form of ammonium acetate
100 mg. of nitrogen per litre in the form of malt extract
50 mg. of nitrogen per litre in the form of the product known as "Marmite" and
2% by weight of sucrose.

To half of these flasks there was added 0.05% by weight of dl-methionine. After 45 hours of fermentation under the same conditions as in Example 1 those flasks to which no methionine had been added assayed 7.8 units/ml. of Cephalosporin N while the remaining flasks assayed 11.2 units/ml.

Example 3

A series of flasks was prepared each containing 4 litres of an organic nitrogen free medium having the following composition:

| | |
|---|---|
| Potassium chloride | 0.06 molar. |
| Disodium phosphate | 0.01 molar. |
| Magnesium sulphate | 0.04 molar. |
| Ferrous sulphate | 0.00005 molar. |
| Manganese sulphate | 0.0005 molar. |
| Ammonium acetate | 0.04 molar. |
| Sucrose | 1.66% (w./v.). |
| Glucose | 0.34% (w./v.). |

Each flask was adjusted to pH 6.5 and autoclaved. To half of the flasks was added 0.004 molar dl-methionine. After 48 hours of fermentation by the method of Example 1, the following results were obtained—

| | Units/ml. |
|---|---|
| Titre without methionine | 2.4 |
| Titre with methionine | 5.2 |

Example 4

Two series of flasks were prepared containing respectively the following fermentation media:

800 mg. of nitrogen per litre in the form of corn steep liquor
800 mg. of nitrogen per litre in the form of ammonium acetate
Sucrose, 2% by weight
0.05% dry weight dl-methionine
1000 mg. of nitrogen per litre in the form of corn steep liquor
1000 mg. of nitrogen per litre in the form of ammonium acetate
Sucrose, 2½% by weight
0.05% dry weight dl-methionine After 52 hours of fermentation under the same conditions as in Example 1, the following results were obtained—

| | Units/ml. |
|---|---|
| Titre with first medium | 10.8 |
| Titre with second medium | 13.9 |

This example is given in order to illustrate the improvement in titre obtainable using an increased quantity of sucrose.

Example 5

Two groups of fermentations were set up comprising the following basic medium—

| | Percent |
|---|---|
| Soya bean meal | 4 |
| Corn meal | 4 |
| Ammonium sulphate | 0.1 |
| Calcium carbonate | 1 |

The pH being adjusted to 7.4 prior to sterilisation.

In one group of fermentations nothing further was added, while the other group received also 0.05% by weight of dl-methionine. These fermentations were carried out in shake flasks at 26° C., each 250 ml. flask containing 50 mls. of medium. As inoculum each flask received 1 ml. of a spore suspension prepared by washing off a culture grown for 15 days at 24° C. on Le Page medium in a 20 oz. medical flat, with 40 mls. of sterile distilled water. After 96 hours' fermentation, the mean titres obtained were—

| without methionine, units/ml. | with methionine, units/ml. |
|---|---|
| 4.5 | 8.1 |

It will be understood that various departures may be made from the specific procedures described herein without departing from the scope of the invention claimed; for example, nutritional substrates other than those shown in the foregoing examples may be employed when local circumstances of availability of supplies render the use of other recipes more convenient. Although optimum results are obtained when the substrate contains ammonium acetate, surcose and/or lactose and a source of organic nitrogen results which are still useful may be obtained in the absence of those materials and it will be appreciated that any substrate which provides the mould with its growth requirements may be employed. It is impossible to enumerate all possible ingredients, but those skilled in the art will have no difficulty in providing nutritional substrates by applying well known principles. Normally the minimum requirements are a source of nitrogen and a source of carbohydrate. Common sources of these materials usually contain quantities of such other materials, e. g. phosphates and trace elements such as iron or manganese as are required for healthy growth. Such other materials may be added however if required. As has been indicated above, whatever substrate is used, the incorporation therein of a small proportion of d-methionine, conveniently in racemic mixture with l-methionine always has a beneficial effect on Cephalosporin N production; indeed by the use of d-methionine, the titre of Cephalosporin N obtainable from a nutrient substrate which normally gives a titre which is too low to be attractive in commercial production, can frequently be raised to an attractive level.

What we claim is:

1. In a process for the production of the antibiotic Cephalosporin N by fermenting a nutritional substrate with a mold of the species of which Cephalosporium I. M. I. 48137 (A. T. C. C. No. 11550) is a member, in the presence of molecular oxygen, the improvement of carrying out the fermenting step with a small proportion of d-methionine in admixture with said substrate, and thereafter separating the mold and the Cephalosporin N thereby produced.

2. In a process according to claim 1, the further feature that said nutritional substrate contains corn steep liquor, ammonium acetate and at least one sugar selected from the group consisting of sucrose and lactose.

3. In a process according to claim 1, the further feature that said nutritional substrate contains a source of nitrogen and a source of carbohydrate, which sources contain quantities of phosphates and trace elements in quantity sufficient to ensure healthy growth of the mold.

4. In a process according to claim 1, the further feature that the d-methionine is present in an amount of up to 0.05% by weight based on the weight of said nutritional substrate.

5. In a process according to claim 1, the further feature that said nutritional substrate contains a source of organic nitrogen.

6. In a process according to claim 1, the further feature that said nutritional substrate contains a source of organic nitrogen, ammonium acetate and at least one sugar selected from the group consisting of sucrose and lactose.

7. In a process according to claim 1, the further feature that the d-methionine is present in an amount of about 0.025% by weight based on the weight of said nutritional substrate.

8. In a process according to claim 1, the further feature that the said d-methionine is added in the form of racemic dl-methionine in an amount of up to 0.1% by weight based on the weight of the substrate.

9. In a process according to claim 1, the further feature that the said d-methionine is added in the form of racemic dl-methionine in an amount of about 0.05% by weight based on the weight of the substrate.

10. In a process according to claim 1, the further feature that the substrate is, after fermentation with the mold, contacted with charcoal under acid conditions to adsorb the Cephalosporin N therefrom.

11. A process according to claim 10 in which a solution obtained by eluting the charcoal is subsequently contacted with a column of alumina and in which the column is subsequently eluted to provide a solution of the Cephalosporin N.

References Cited in the file of this patent

UNITED STATES PATENTS 2,563,793   Moyer _____ Aug. 7, 1951

OTHER REFERENCES

Porter: Bacterial Physiology, 1946, John Wiley & Sons, pp. 704–709.

Cardinal: Jour., Biochem. Soc. 172, January–February 1948, pp. 609–612.

Crawford et al.: Jour. Gen. Microbiol., 1952, vol. 6, pp. 47–59, 167–65.04.

Newton et al.: Nature, 172, August 29, 1953, page 395.